United States Patent
Paripally et al.

(10) Patent No.: US 8,970,655 B2
(45) Date of Patent: Mar. 3, 2015

(54) REFLECTIVE AND REFRACTIVE SOLUTIONS TO PROVIDING DIRECT EYE CONTACT VIDEOCONFERENCING

(71) Applicant: Polycom, Inc., San Jose, CA (US)

(72) Inventors: Gopal Paripally, North Andover, MA (US); Craig Clapp, Boxford, MA (US); Tony Pham, Westborough, MA (US)

(73) Assignee: Polycom, Inc., San Jose, CA (US)

( * ) Notice: Subject to any disclaimer, the term of this patent is extended or adjusted under 35 U.S.C. 154(b) by 145 days.

(21) Appl. No.: 13/715,188

(22) Filed: Dec. 14, 2012

(65) Prior Publication Data

US 2013/0155176 A1    Jun. 20, 2013

Related U.S. Application Data

(60) Provisional application No. 61/576,714, filed on Dec. 16, 2011.

(51) Int. Cl.
*H04N 7/15* (2006.01)
*H04N 7/14* (2006.01)

(52) U.S. Cl.
CPC . *H04N 7/15* (2013.01); *H04N 7/144* (2013.01)
USPC ... 348/14.07; 250/208.1; 345/1.3; 348/14.01; 348/14.08; 348/47; 348/722; 348/764; 353/37; 353/99; 353/121; 359/618

(58) Field of Classification Search
CPC .... H04N 5/225; H04M 11/066; G02B 27/017
USPC ........... 250/208.1; 345/1.3; 348/14.01, 14.07, 348/14.08, 14.16, 47, 722, 764; 353/37, 99, 353/121; 359/618
See application file for complete search history.

(56) References Cited

U.S. PATENT DOCUMENTS

| | | | | |
|---|---|---|---|---|
| 5,402,184 A * | 3/1995 | O'Grady et al. | ............... | 348/764 |
| 5,612,734 A * | 3/1997 | Nelson et al. | ............... | 348/14.16 |
| 6,104,424 A * | 8/2000 | McNelley | ................... | 348/14.16 |
| 6,840,634 B1 * | 1/2005 | Chang | .............................. | 353/99 |
| 7,876,286 B2 * | 1/2011 | Kee et al. | ......................... | 345/1.3 |
| 7,943,893 B2 * | 5/2011 | Sawai | ......................... | 250/208.1 |
| 8,201,951 B2 * | 6/2012 | Ding et al. | ..................... | 353/121 |
| 8,208,002 B2 * | 6/2012 | Saleh et al. | ................ | 348/14.08 |
| 8,228,371 B2 * | 7/2012 | Sobel et al. | ...................... | 348/47 |
| 8,498,054 B2 * | 7/2013 | Beach et al. | ................... | 359/618 |
| 8,585,209 B2 * | 11/2013 | Hirata et al. | .................... | 353/37 |
| 8,643,691 B2 * | 2/2014 | Rosenfeld et al. | .......... | 348/14.01 |
| 2009/0256970 A1 * | 10/2009 | Bilbrey et al. | ................. | 348/722 |
| 2011/0134205 A1 * | 6/2011 | Arney et al. | ................ | 348/14.08 |
| 2012/0257004 A1 * | 10/2012 | Smith et al. | ................ | 348/14.16 |
| 2012/0287223 A1 * | 11/2012 | Zhang et al. | ................ | 348/14.08 |
| 2013/0155176 A1 * | 6/2013 | Paripally et al. | ........... | 348/14.07 |

* cited by examiner

*Primary Examiner* — Gerald Gauthier
(74) *Attorney, Agent, or Firm* — Wong, Cabello, Lutsch, Rutherford & Brucculeri, L.L.P.

(57) ABSTRACT

A videoconferencing unit for enhancing direct eye-contact between participants can include a curved fully reflective mirror to reflect the image of the near end to a camera. The curved mirror can be placed in front of the display screen near a location where images of faces/eyes of far end participants are to appear. In another example, the videoconferencing unit can include a disintegrated camera configuration that provides an air gap between a front lens element and a rear lens element. The front lens element can be located behind an aperture within the display screen. The air gap can provide an unobstructed path to light from projectors and therefore avoid any undesirable shadows from appearing on the display screen. In another example, the videoconferencing unit can include a combination of the disintegrated camera configuration and mirrors for providing direct eye contact videoconferencing.

30 Claims, 7 Drawing Sheets

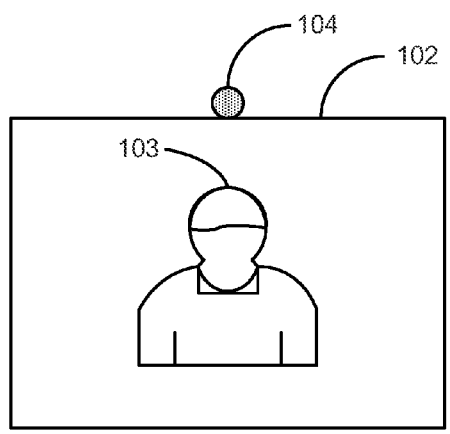
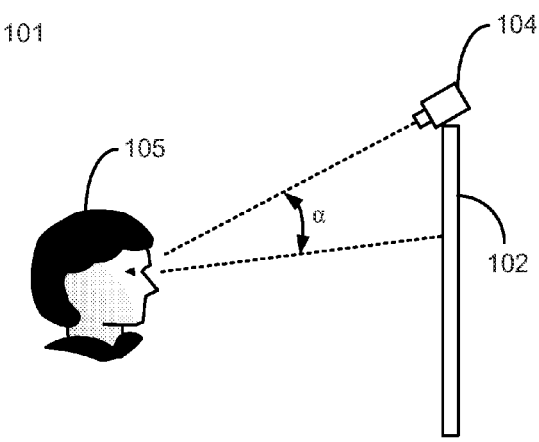
FIG. 1A (prior art)  FIG. 1B (prior art)
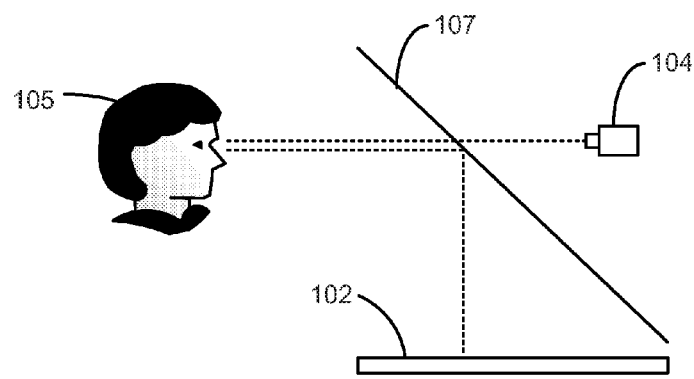
FIG. 2
(prior art)

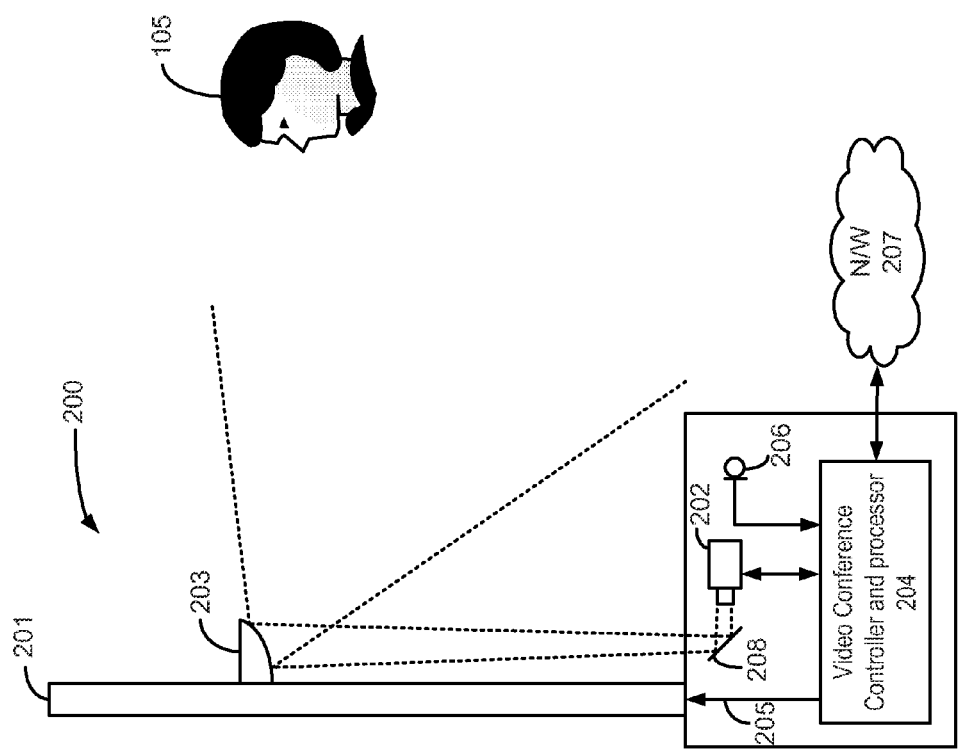

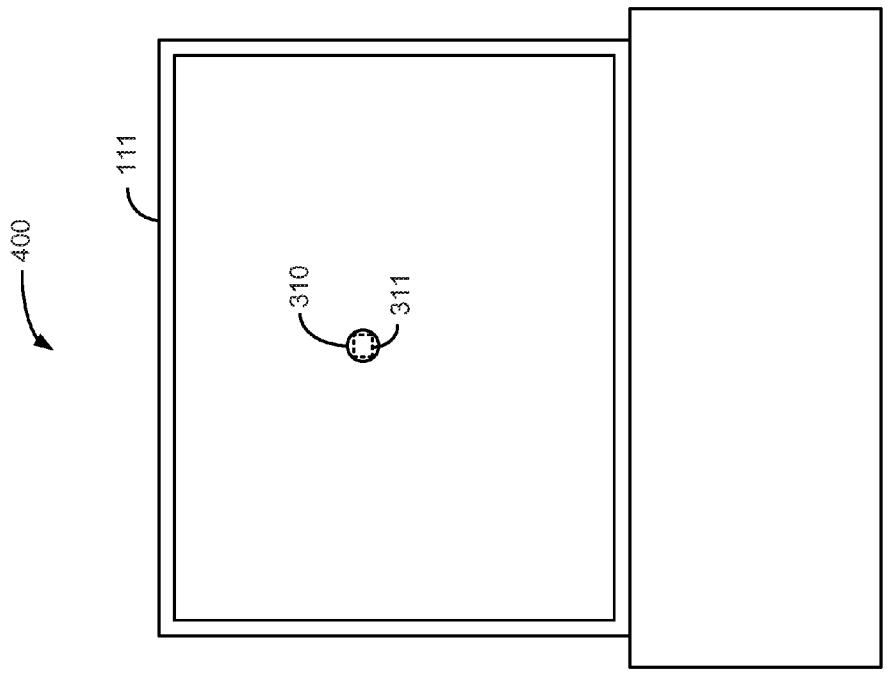
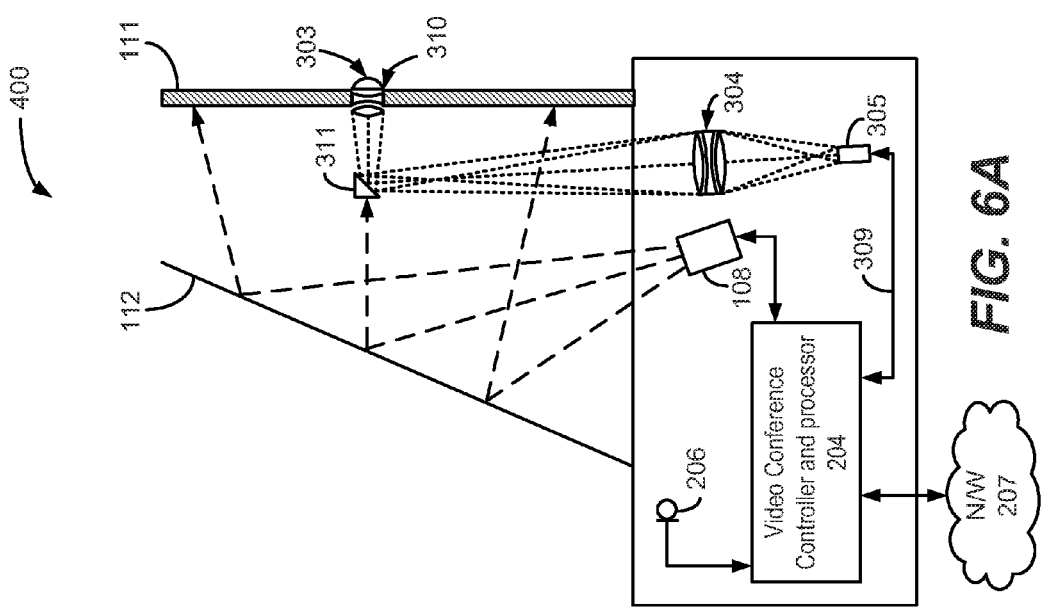
FIG. 6B
FIG. 6A

REFLECTIVE AND REFRACTIVE SOLUTIONS TO PROVIDING DIRECT EYE CONTACT VIDEOCONFERENCING

CROSS-REFERENCE TO RELATED APPLICATION

This is a non-provisional of U.S. application Ser. No. 61/576,714, filed Dec. 16, 2011 which is incorporated herein by reference and to which priority is claimed.

FIELD OF THE INVENTION

The present invention relates generally to communication systems, and more particularly to video conferencing units.

BACKGROUND

FIGS. 1A-1B show one arrangement of a camera and a display screen in a videoconferencing unit 101. FIG. 1A shows a front view of a display screen 102 displaying an image 103 of the far end participant. Camera 104 is placed on top of the display screen 102 for capturing an image of a near end participant 105. Typically, while communicating, the near end participant 105 will look into the eyes of the far end participant displayed on the display screen 102. The exact location on the display screen 102 where the far end participant's eyes appear may vary; but, generally, they may appear anywhere above the half and below two-thirds of the height of the display screen 102. The camera 104 is however placed at the top of the display screen 102. Therefore, the image of the near end participant 105 captured by camera 104 will appear as if the near end participant 104 is looking downwards. As a result, the far end participants will see the image of the near end participant looking not straight out at them, but undesirably downwards. If the far end videoconferencing unit has a similar setup as shown for the near end videoconferencing endpoint in FIG. 1A, then the image of the far end participant captured by the far end camera will also suffer from the same downward looking feature. In such cases, both the near end and far end participants will not be able to make direct eye contact with the images of the other end. Naturally, this is undesirable.

Note that the downward looking effect gets worse with an increase in the angle α subtended at the eyes of the near end participant 105 by the near end camera and a location on the display screen 102 where eyes of the far end participant are displayed. Angle α is a function of two distances: (i) the horizontal distance between the near end participant 105 and the display screen 102 and (ii) the perceived distance (in a vertical plane) between the camera 104 and the location on the display screen 102 where the far end participant's eyes are displayed. Angle α is inversely proportional to the horizontal distance, i.e., angle α decreases with increase in the distance between the near end participant and the display screen. Further, angle α is directly proportional to the perceived distance, i.e., angle α decreases with decrease in the perceived distance between the camera and the location on the display screen where the eyes of the far end participant are displayed. It will be appreciated by a person skilled in the art that the apparent lack of direct eye contact decreases with the decrease in angle α. Typically, a value of angle α that is less than or equal to approximately 5 degrees is sufficient in rendering the apparent lack of direct eye contact to imperceptible levels.

There are several solutions in the prior art that attempt at solving the above problem of apparent lack of direct eye contact. One such solution is shown in FIG. 2, in which a teleprompter style display and camera setup minimizes angle α. The display screen 102 is placed horizontally over which a half-silvered mirror 107 of substantially same width as the display screen 102 is placed in a manner such that the image displayed on the display screen 102 is reflected off the mirror 107 and visible to the near end participant 105. Camera 104 is placed behind the mirror 107 so that even though the near end participant 105 is visible to the camera 104, the camera 104 itself is not visible to the near end participant 105. Camera 104 is placed at a height at which the eyes of the far end participants are anticipated to appear on the mirror 107 as seen by the near end participant 105. Consequently, the angle α is minimized, and in the image captured by the camera 105 when displayed to the far end participant, it appears as if the near end participant is making direct eye contact with the far end participant. However, the horizontal placement of the display screen 102 and the angled mirror 107 occupy considerable space. Furthermore, the size and weight of the mirror 107 can be quite large, making the videoconferencing system of FIG. 2 bulky.

Another solution is shown in FIG. 3A, in which a rear projection system is modified to provide direct eye contact. In this example, camera 104 is placed behind a rear projection screen 111 having an aperture 110, such that the camera 104 can capture the images of the near end participants in front of the screen 111. A cable 109 connects the camera to a controller 113. Images of the far end participants is emitted by projector 108 onto a mirror 112, which is placed behind the rear projection screen 111 at an angle such that the projected images are reflected by the mirror 112 and projected on the screen 111. The positions of mirror 112 and the aperture 110 are selected such that the images of the eyes/faces of the far end participants appear near the aperture 110. Thus, when the near end participants look at the images of face/eyes of the far end participants on screen 111, they would be also making direct eye contact with the camera 104. As a result, in the captured images of the near end participants, it will appear as if the near end participants is making direct eye contact with the far end participant.

However, the solution depicted in FIG. 3A has a few disadvantages, which are shown in FIG. 3B. FIG. 3B shows a front view of the rear projection system of FIG. 3A. Because the camera 104 and the cable 109 lie in the path of the light rays reflected from the mirror 112, the camera 104 and cable 109 cast a shadow onto the screen 111. For example, shadow 115 can be attributed to the cable 109, while circular shadow 116 can be attributed to the camera 104. Shadows 115 and 116 can be distracting to the near end participants. Thus, such a setup is ill-suited to a videoconferencing unit.

SUMMARY

A videoconferencing unit for enhancing direct eye-contact between participants can include a curved fully reflective mirror to reflect the image of the near end to a camera. The curved mirror can be placed in front of the display screen near a location where images of faces/eyes of far end participants are to appear. The camera can be placed at a location that is outside the view of the near end participants. The video conferencing unit can include a processor for correcting any image distortions due to the curvature of the mirror.

In another example, the videoconferencing unit can include a disintegrated camera configuration that provides an air gap between a front lens element and a rear lens element. Light is captured by the front lens element and passed to a sensor via the rear lens element. The front lens element can be located behind an aperture within the display screen, where the aperture is positioned at a location on the display screen where images of faces/eyes of the far end participants appear. The air gap between the front lens element and the rear lens element can provide an unobstructed path to light from a projector that projects images of far end participants onto the display screen. Thus, any undesirable shadows are avoided from appearing on the display screen.

In another example, the videoconferencing unit can include a combination of the disintegrated camera configuration and mirrors for providing direct eye contact videoconferencing.

BRIEF DESCRIPTION OF THE DRAWINGS

Exemplary embodiments of the present invention will be more readily understood from reading the following description and by reference to the accompanying drawings, in which:

FIGS. 1A and 1B show a videoconferencing endpoint where the camera is located on top of the display screen, as known in the prior art;

FIG. 2 illustrates a teleprompter style videoconferencing endpoint known in the prior art;

FIG. 4C illustrates an alternative configuration of the video conferencing unit of FIG. 4A;

FIGS. 6A and 6B show a combined reflective and refractive approach for providing direct eye contact rear projection video conferencing unit;

DETAILED DESCRIPTION

Figure 4B:
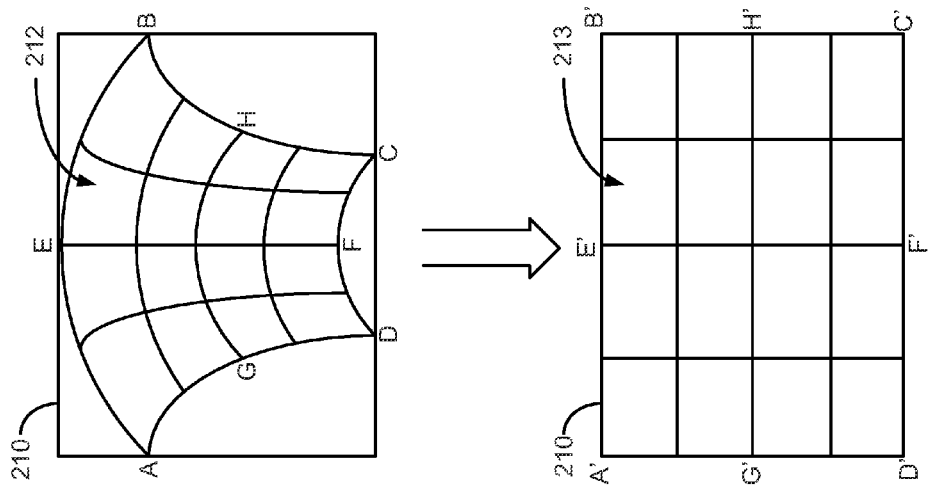
FIG. 4B illustrate a technique for correcting distortion of an image frame captured by a camera of FIG. 4A.
Figure 4A:
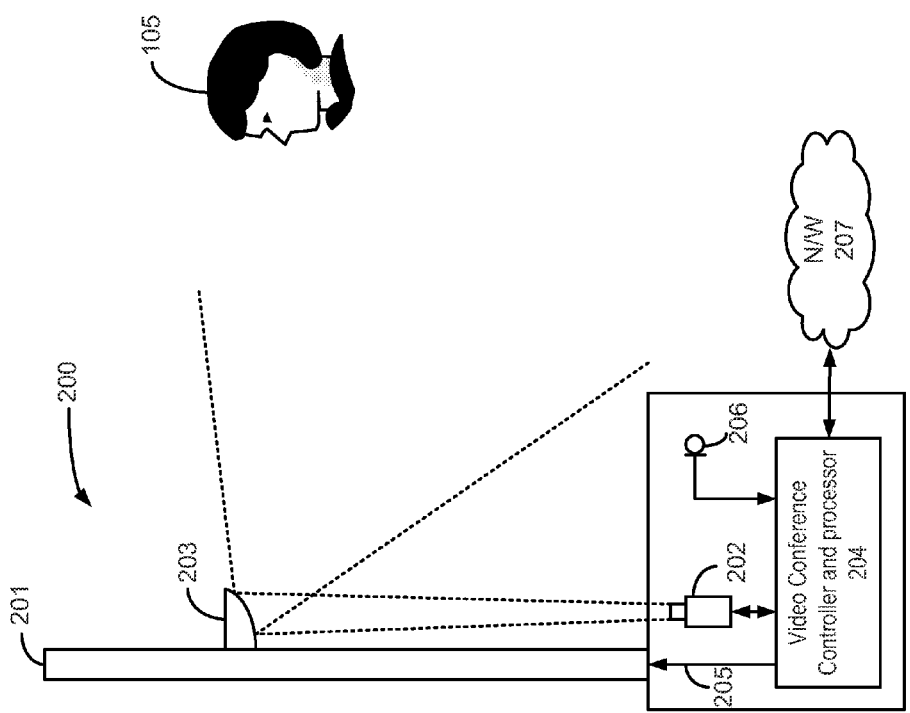
FIG. 4A illustrates a direct eye contact video conferencing unit using reflective approach by having a curved fully reflective mirror.

FIG. 4A shows one approach for providing direct eye contact video conferencing. Video conference unit 200 can include a display screen 201 placed in front of user 105, which display screen 201 displays video images of far end participants. The display screen can be a projection-type, an LCD or plasma flat panel, a CRT-based display, etc. A curved mirror 203 can be placed in front of the display screen 201 at the location near where images of eyes/face of the far end participant are to appear. As noted above, this will typically be in the top half of the screen but not much higher than the $\frac{1}{3}^{rd}$ of the way down from the top of the screen. As an example, the curved mirror 203 can be placed such that the vertical distance between the top of the display screen 201 and the curved mirror is approximately $\frac{1}{4}^{th}$ the height of the display screen 201 below the top of the display screen. This allows the mirror to be placed so that it is substantially out of the way of the image of the far-end participant presented to the near end user while still being close enough to achieve the desired effect of maximizing eye contact. Also, the curved mirror 203 can be placed in a horizontally centered position on the display screen, i.e., such that it is horizontally equidistant from the two vertical edges of the display screen 203. In another embodiment, where a display is configured to display two far-end participants, the display could be positioned at approximately the eye level of the far-end participants and between them so as to prevent obscuring the far-end participant's faces at all.

The curved mirror 203 can be glued to the display surface, or affixed using screws and bolts. The means for affixing can depend upon the surface of the display screen 201. For example, with a glass screen, it may be advisable to employ a non-invasive approach by using glue. In some cases a bracket (not shown) can be glued to the display screen 201 surface, which bracket can receive mirrors of different sizes and curvatures. In yet another example, the mirror 203 may be attached to one end of a substantially transparent arm whose other end is attached to a bezel at the top of the display screen 201. This way the display surface of the display screen 201 is not harmed or tarnished and the substantially transparent arm does not impede the viewing of images displayed on the display screen 201. Such substantially transparent arms can be fabricated in a variety of fashions and from a variety of materials, including substantially transparent plastics or acrylics such as polycarbonates, PLEXIGLAS®, and the like.

The reflective surface of the mirror 203 is placed such that it faces in the direction of the camera 202. In the example of FIG. 4A, the reflective surface of the mirror 203 can face downwards in the direction of the camera 202. Alternatively, if the camera 202 were to be placed at the top, then the reflective surface of the mirror 203 would be facing upwards. The reflective surface of the mirror 203 can be fully reflective, such that it reflects as much light as possible. The reflective surface can include high-reflective coatings, such as metals (e.g., aluminum, silver, etc.) and dielectrics. Camera 202 can be placed and zoomed in such that reflective surface of the mirror 203 occupies maximum amount of the image area captured by the camera 202.

The image of the near end, including the image of the near end participant 105 will appear on the mirror 203, which image is captured by the camera 202. Because the mirror 203 has a curved reflective surface, the image of the near end (as seen by the camera 202) may be distorted. However, such distortion can be corrected using image processing techniques within the controller and processor 204. FIG. 4B shows an exemplary shape of a distorted view of the near end. Rectangular region 210 can represent a rectangular image frame captured by the camera 202 (FIG. 4A). Within the rectangular region 210, the image can include a distorted region A-E-B-H-C-F-D-G 212, which represents a desired region of the near end. Curved grid lines (e.g., EF and GH) within the distorted region 212 are merely shown to illustrate the nature and degree of distortion.

Processor 204 (FIG. 4A) can receive the image frame 210 having the distorted region 212 and process the pixels within the image frame 210 to correct for the distortion. For example, the processor 204 (FIG. 4A) can transform the positions of image frame pixels such that distorted region 212 can be transformed to corrected region A'-E'-B'-H'-C'-F'-D'-G' 213. This is done by moving the pixel at position A to position A', pixel at position B to position B', pixel at position C to position C', and so on. All other pixels can be re-positioned in relation to pixels at positions A'-F'. Another approach to the correction of distortion is to map the grid pattern shown in region 212 onto the pixels in frame 210, and then re-position the pixels within distorted region 212 such that the grid lines are straightened as shown in corrected region 213. The determination of the transformation function, which re-positions the pixels, need to be performed only once for a given mirror 203 (FIG. 4A) and camera 202 (FIG. 4A) and can be stored in memory. Afterwards, every frame captured by the camera 202 (FIG. 4A) can be transformed using the transformation function to remove any distortion. This allows distortion correction in real time with only a small impact on latency of transmission of images to the far end.

Turning back to FIG. 4A, video conference unit 200 can also include one or more microphone 206 for capturing sound (e.g., voice of participant 105) at the near end. Controller and processor 204 can include video and audio codecs for encoding and compressing corrected video frames and audio signals. Examples of video codecs can include H.263, H.264, etc., while examples of audio codecs can include G.719, G.712, MP3, etc. Controller and processor 204 can also include a network interface (not shown) for transmitting the compressed audio and video streams to the far end and for receiving audio and video streams from the far end over the network 207, which can include packet switched networks, circuit switched networks, wireless networks, PSTN, etc.

FIG. 4C illustrates another example, in which a second mirror 208 can be introduced between the curved mirror 203 and the camera 202. Which allows the camera to be repositioned in such a way as to minimize the amount camera extends below the display. Additionally, mirror 208 can also serve as a correction mirror. In such an example, the mirror 208 can have a curvature (instead of the planar mirror shown in FIG. 4C) that is complementary to the curvature of curved mirror 203. Thus, the distortion imparted by the curved mirror 203 would be corrected by the correction mirror 208. As a result, the image frame captured by the camera 202 can be free of (or have reduced) distortion. Thus, distortion correction burden on the processor 204 can be reduced or eliminated.

Although the foregoing embodiments have been described with the mirror located in front of the display screen, they could also be constructed with the mirror located behind the screen. In such embodiments, the display may include an aperture as described below, allowing light reflected from the near end participant to reach the mirror and be reflected to the camera image sensor. Additionally, although the foregoing embodiments have been described with a curved mirror reflecting the image of the near end participant to the camera image sensor, it would also be possible to use a planar mirror.

Figure 5:
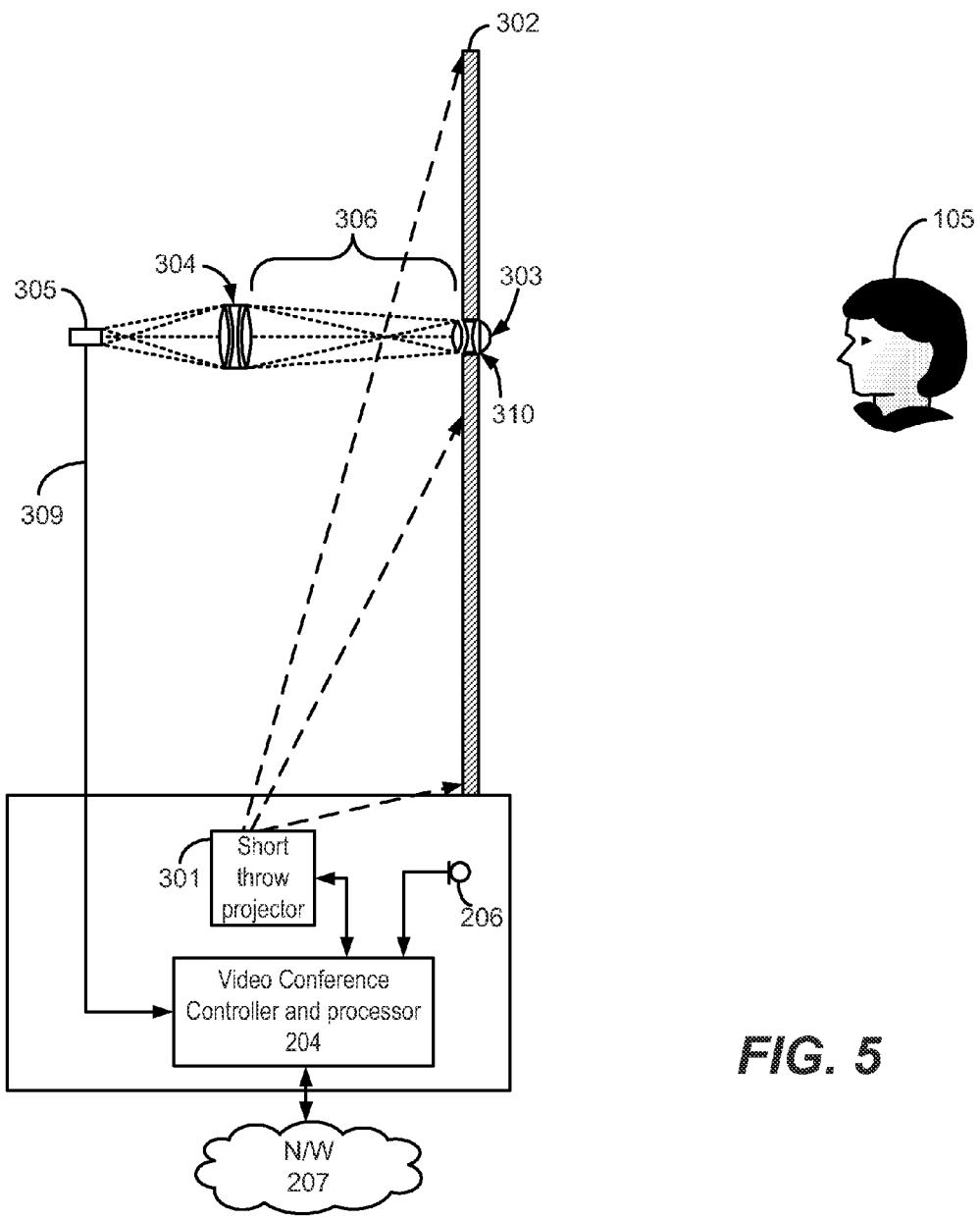
FIG. 5 illustrates a direct eye contact video conferencing system using a refractive approach by having a disintegrated camera with an air gap between its front and rear lens elements.

While FIGS. 4A-4C illustrated a reflective approach (using curved mirror 203 and optionally mirror 208) in providing direct eye contact video conferencing, FIG. 5 illustrates a refractive approach. Video conferencing unit 300 can be of the rear projection type, and can include a short-throw projector 301, which projects images of far end participants on a display screen 302. Short-throw projectors and ultra-short-throw projectors are well known in the art. As the name suggests, these projectors require only a short distance between the display screen and the image source. For example, Sanyo's XL series of ultra-short-throw projectors can project an image 80 inches in size (measured diagonally) from as little as 3 inches away from the display screen.

The projector 301 projects images of the far end participants onto a rear projection display screen 302. Display screen 302 can include an aperture 310 to allow for a camera to capture images of the near end participants such as participant 105. The aperture can be located at position that is near a position where images of the face/eyes of the far end participants are to appear. Thus, when participant 105 looks at the image of the face/eyes of the far end participants on the display screen 302, the participant 105 is also looking directly at the front lens element 303—resulting in a perception of direct eye contact.

It will be appreciated that if a conventional camera (such as camera 104 in FIG. 3A) were to be placed behind the aperture 310 in FIG. 5, then such camera 104 would obstruct the light projected from the projector 301. As a result, a shadow will be cast on the rear of the display screen 302, which shadow can be distracting to the near end participants. To avoid any undesirable shadows, the video conference unit 300 of FIG. 5, instead uses a disintegrated camera formed by front lens element 303, rear lens element 304 and sensor 305. Unlike traditional cameras—in which the front and rear lens elements are enclosed in an opaque tube-like enclosure—the front lens element 303 and the rear lens element 304 are separated by an air gap 306. Air gap 306 can allow projector 301 to project images on the display screen 302 without any obstruction. As a result, no shadows are formed on the rear of the display screen 302.

Front lens element 303 can include one or more lenses that can direct light from the near end site in front of the display screen 302 to the rear lens element 304. (Note that in general optics usage, a "lens" may include multiple individual pieces or segments known as "elements." However, as used herein, the front lens element and rear lens element combine to form a disintegrated, air-gap lens, and each of the front and rear elements may include multiple optical components or "elements" as that term is conventionally used.) The front lens element 303 can have a focal length that allows it to capture a wide angle view of the near end site. Depending upon the length of the air gap 306, the front lens element 303 can include additional lens components that allow the light captured from the near end site to be projected on the rear lens element 304. It is advantageous to make the front lens element 303 as unnoticeable to the near end participant 105 as possible. Therefore, the surface of the front lens element 303 can include an anti-reflective coating to minimize reflections. Additionally, the lens system can be designed so as to minimize the size of the front lens element 303.

Rear lens element 304 can include one or more lenses that allow the light received from the front lens element 303 to be projected on the sensor 305. The focal length of the rear lens element can be a function of its relative distance from the front lens element and the sensor 305. As in the case of the reflective systems described above, rear lens element 304 may also be designed with profile and properties to correct any distortion introduced by front lens element 303.

Sensor 305 can include a color image sensor such as charged coupled device (CCD) sensor, complementary metal-oxide semiconductor (CMOS) sensor, etc. Because the front lens element 303 and the rear lens element 304 accomplish the task of focusing the near end site image onto the sensor 305, sensor 305 may exclude any lenses, except for perhaps some glass or plastic cover to protect the image sensor. Alternatively, the rear lens element 304 could be integrated with sensor 305, or sensor 305 could include still further lens elements. Sensor 305 can generate image frames at one or more preset rate, for example, 30 frames per second. Image frames generated by the sensor 305 can be transmitted to an input port of controller and processor 204 via cable 309. Note that the cable 309 does not obstruct light emitted by the projector 301; and therefore, will not cast any undesirable shadows on the back of the display screen 302.

In one example, the rear lens element 304 and the sensor 305 can be enclosed in a single enclosure while maintaining the air gap 306 between the rear lens element 304 and the front lens element 303. Such an integral mounting arrangement can provide a number of advantages. For example, the enclosure can ensure that the alignment of the rear lens element 304 in relation to the sensor 305 is robust and secure. As such, during initial setup, only two objects—the front lens element 303 and the enclosure containing the rear lens element 304 and the sensor 305—need to be aligned as opposed to aligning three objects (front lens element 303, rear lens element 304, and sensor 305) if no enclosure was present. The enclosure can also have a mounting mechanism to affix the enclosure on a mounting arm that may extend vertically from the cabinet 308.

Figure 3B:
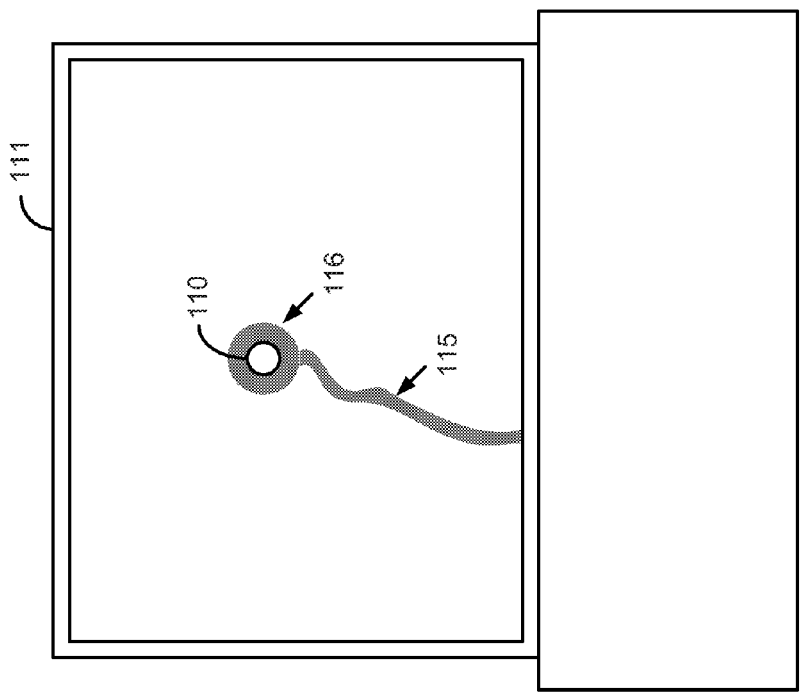
FIGS. 3A and 3B illustrate a rear projection video conferencing system known in the prior art.
Figure 3A:
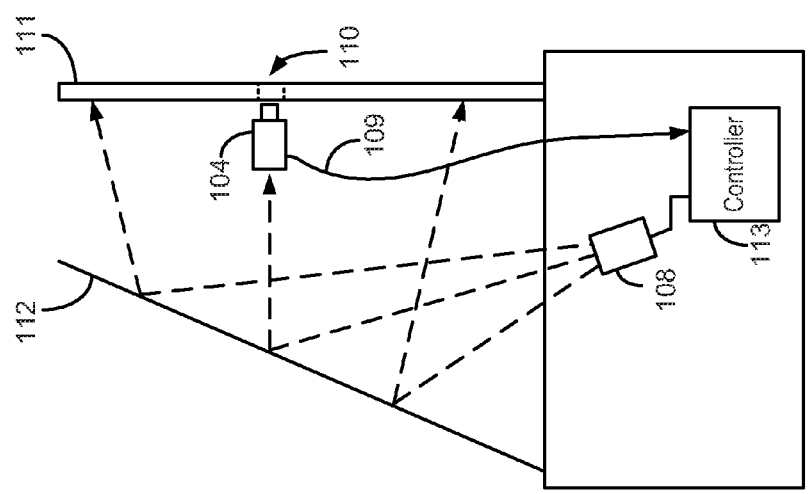

The disintegrated camera approach described above with reference to FIG. 5 can also be used to eliminate shadows in a rear projection video conference unit that uses a rear projection mirror (as shown in FIG. 3A). In FIG. 6A, a mirror 311 can be introduced between the front lens element 303 and the rear lens element 304. Mirror 311 reflects light captured by the front lens element 303 onto the rear lens element 304, which, in turn, refracts the light onto the sensor 305. Mirror 311 can have a small form factor, with width and/or height being approximately equal to or less than the diameter of the front lens element 303. The configuration shown in FIG. 6A provides minimal obstruction to the light emitted from the projector 108 and reflected by rear mirror 112. In contrast with the prior art video conference unit of FIG. 3A, there is no cable obstructing the light path. Cable 309, which connects the sensor 305 to the controller and processor 204, is outside the light path. Furthermore, unlike FIG. 3A, there is no camera 104 obstructing the light path either. While mirror 311 does lie in the path of the light reflected from the rear mirror 112, the small size of the mirror 311 can result in a shadow that has a size smaller than or similar to the aperture 310. As such, any shadow cast by the mirror 311 would either be invisible or be small enough not to distract the near end participant 105.

FIG. 6B illustrates the front view of the video conference unit 400 of FIG. 6A. Unlike prior art video conference unit of FIG. 3B, no undesirable shadow is cast on the display screen 111. The dotted square within the aperture 310 denotes the shadow cast by the mirror 311, which shadow is cast on the rear of the front lens element 303 and is practically invisible to the near end participant.

Figure 7B:
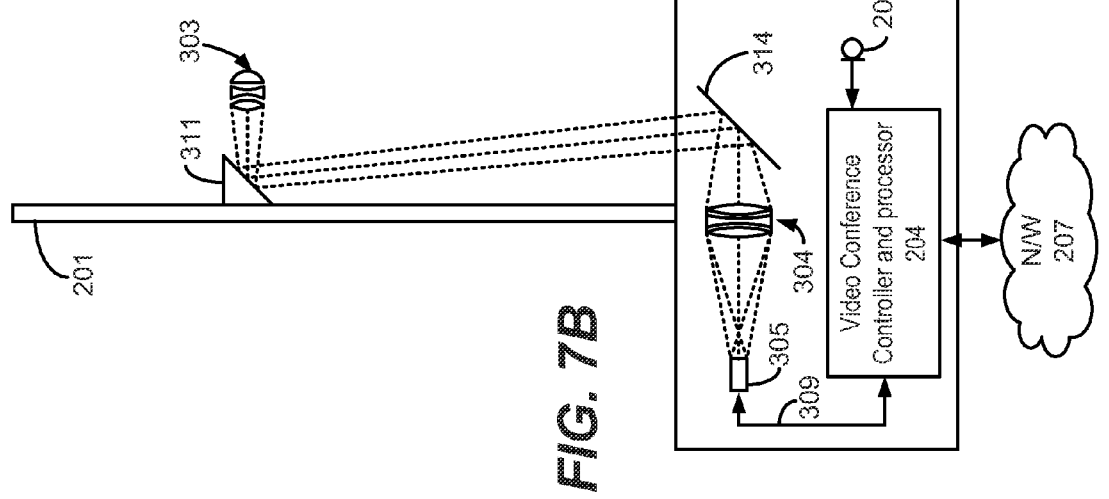
FIGS. 7A and 7B show another example of combined reflective and refractive approach to provide direct eye contact videoconferencing for flat screen video conferencing units.
Figure 7A:
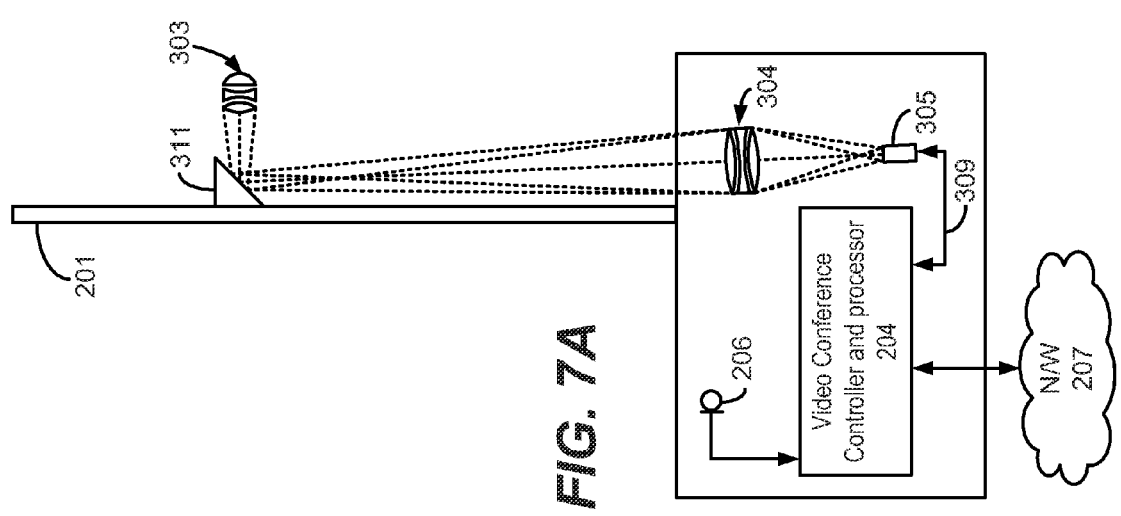

The examples shown in FIGS. 5A and 6A were directed to screens that can provide an aperture for receiving the front lens element 303. However, display screens such as LCD screens and some projection screens may not be able to provide such an aperture (although it would be possible to specially fabricate such a display screen). Nonetheless, the disintegrated camera approach can be applied to such display screens (as well as any other type of display screen) by combining refracting and reflecting elements. For example, FIG. 7A shows a LCD display screen 201 for displaying images of far end participants. The front lens element 303 can capture light from the near end site and direct it to the mirror 311. Mirror 311 reflects the light received from the front lens element 303 to the rear lens element 304, which subsequently directs the light to the sensor 305. The configuration in FIG. 7B is similar to the one in FIG. 7A, except that mirror 314 is positioned between the front lens element 303 and the rear lens element 304.

As will be appreciated, optical design for the systems described herein becomes increasingly demanding as the air gap gets larger. Thus, it might be preferable to place the camera at the edge of the screen closest to the on-screen element (mirror or lens). Given an eye position substantially above halfway up the screen this may promote the top edge of the screen as being preferred over the bottom edge as the position for the camera. It will be further appreciated that if the camera is at the top edge of the screen there tends to be more reason for wanting the second mirror because it lets the camera be "wrapped" over the top edge of the display instead of sticking up obtrusively.

Additionally, in some cases near end participants may see reflections in the curved mirror from all around the room (which may be distracting). Whether to have the curved mirror facing up or down may be predicated on which orientation best matches those reflections to what is being displayed on the screen surrounding to the mirror's position. Room design may play into this. For example, if the ceiling and side walls are a good match to the far-end rear wall then an upward facing mirror is good. Alternatively, if the floor and side walls are a good match to the far-end rear wall then a downward facing mirror is good. Additionally, a potential benefit of the embodiment shown in FIG. 7 configuration over that in FIG. 4 is that assembly 303/311 can be made substantially non-reflective, thereby avoiding the potentially distracting reflections seen by near-end participants off of curved mirror 203.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A videoconferencing unit comprising:
a display screen configured to display images of a far end participant;
a first curved mirror positioned in front of the display screen at a location where an image of eyes of the far end participant is displayed; and
a camera positioned to capture an image of a near end participant via a reflection from the first mirror through an air gap.

2. The videoconferencing unit of claim 1 wherein the first curved mirror is fully silvered.

3. The videoconferencing unit of claim 1 wherein the first curved mirror is positioned at a location approximately $\frac{1}{4}^{th}$ the height of the display screen below the top of the display screen.

4. The videoconferencing unit of claim 1 wherein the curved mirror is horizontally centered on the display screen.

5. The videoconferencing unit of claim 1 wherein the first curved mirror is affixed to the display surface.

6. The videoconferencing unit of claim 1 wherein the first curved mirror is mounted in a bracket affixed to the display surface.

7. The videoconferencing unit of claim 1 wherein the first curved mirror is attached to a substantially transparent arm, the arm being attached to a bezel of the display screen.

8. The video conferencing unit of claim 1, further comprising a processor configured to correct distortions caused by the first curved mirror in the image captured by the camera.

9. The videoconferencing unit of claim 1 further comprising a second mirror positioned to reflect the reflection from the first mirror onto the camera.

10. The videoconferencing unit of claim 9, wherein the second mirror is planar.

11. The videoconferencing unit of claim 9, wherein the second mirror has a curvature that corrects for distortions in the image caused by the first mirror.

12. A videoconferencing unit comprising:
a display screen having a front side, a rear side, and an aperture positioned near a location where an image of eyes of the far end participant is to be displayed;

a projector positioned on the rear side of the display screen and configured to project the images of far end participants onto the display screen;

a first lens element positioned to receive light reflected from the near end participant through the aperture;

a rear lens element positioned on the rear side of the display screen and receiving light refracted by the first lens element, the first lens element and the rear lens element being separated by an air gap wherein a light path of the projected images passes through the air gap; and a camera sensor for receiving light refracted from the rear lens element and generating a corresponding near end image frame.

13. The videoconferencing unit of claim 12, wherein the projector is a ultra-short-throw projector.

14. The videoconferencing unit of claim 12 wherein the rear lens element is configured to correct distortions introduced by the first lens element.

15. The videoconferencing unit of claim 12 further comprising a processor configured to correct distortions in the image captured by the camera sensor introduced by at least one of the first lens and rear lens elements.

16. The videoconferencing unit of claim 12 wherein the rear lens element and camera sensor are integrated into a single assembly.

17. The videoconferencing unit of claim 12, further comprising a first reflective mirror for reflecting projected images of far end participants from the projector onto the rear side of the display screen.

18. The videoconferencing unit of claim 17, further comprising a second reflective mirror positioned behind the first lens element such that the rear lens element receives light refracted by the first lens element via reflection from the second reflective mirror.

19. The videoconferencing unit of claim 12 comprising a mirror positioned behind the first lens element and configured to reflect light refracted by the first lens element to the rear lens element.

20. A videoconferencing unit comprising:
a display screen configured to receive and display an image of a far end participant;
an image sensor configured to capture an image of a near end participant;
at least one optical element positioned near a location on the display where an image of eyes of the far end participant is to be displayed and configured to reflect or refract the image of the near end participant through an air gap to the image sensor.

21. The videoconferencing unit of claim 20 wherein the at least optical element comprises a mirror configured to reflect the image of the near end participant through an air gap to the image sensor.

22. The videoconferencing unit of claim 21 wherein the mirror is a curved mirror.

23. The videoconferencing unit of claim 20 wherein the at least one optical element comprises a lens configured to refract the image of the near end participant through an air gap to the image sensor.

24. The videoconferencing unit of claim 20 wherein the at least one optical element is located in front of the display screen.

25. The videoconferencing unit of claim 20 wherein:
the at least one optical element is located behind the display screen; and
the display screen includes an aperture positioned near a location on the display where an image of eyes of the far end participant is to be displayed.

26. The videoconferencing unit of claim 20 further comprising at least one of a programmed processor or one or more additional optical elements configured to correct distortions in the image of the near end participant introduced by the at least one optical element.

27. The videoconferencing unit of claim 26 wherein the one or more additional optical elements are integrally mounted with the image sensor.

28. The videoconferencing unit of claim 20 wherein the display screen is a projection screen.

29. A method of providing direct eye contact in a videoconference, the method comprising:
displaying an image of a far end participant on a display screen;
capturing an image of a near end participant, the image being reflected or refracted through an air gap by at least one optical element positioned near a location on the display screen where eyes of the far end participant are displayed.

30. The method of claim 29 further comprising correcting distortion in the captured image of the near end participant introduced by the at least one optical element.

* * * * *